Jan. 3, 1933. C. C. SLEFFEL 1,893,183
AIR MANIFOLD FOR INTERNAL COMBUSTION ENGINES
Filed Sept. 20, 1930
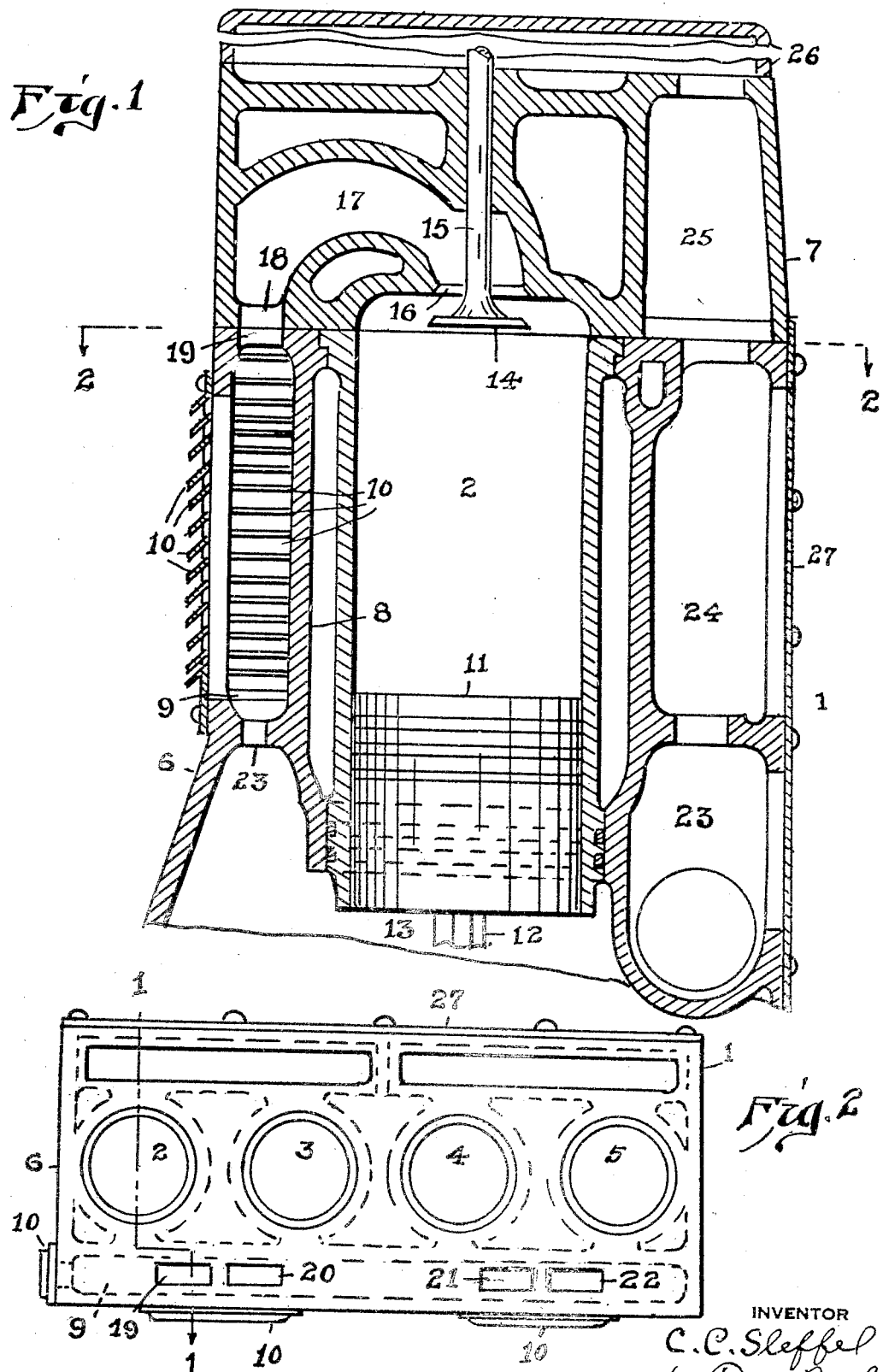

Patented Jan. 3, 1933

1,893,183

UNITED STATES PATENT OFFICE

CHARLES C. SLEFFEL, OF SPRINGFIELD, OHIO, ASSIGNOR TO SUPERIOR ENGINE COMPANY, OF SPRINGFIELD, OHIO, A CORPORATION OF DELAWARE

AIR MANIFOLD FOR INTERNAL COMBUSTION ENGINES

Application filed September 20, 1930. Serial No. 483,198.

My invention relates to air manifolds for internal combustion engines of the Diesel type.

It is one object of this invention to provide an air inlet chamber or manifold constructed within one of the walls of the cylinder block and having suitable outlet ports spaced to register with ports leading to the air inlet valve. Another object is to exhaust the gases from the crank case of the engine and conduct them into the explosion chambers along with the air going through the inlet valves. Other objects appear hereinafter.

Referring to the accompanying drawing, Fig. 1 is a vertical cross-section on the line 1—1 on Fig. 2, parts being omitted and broken away. Fig. 2 is a horizontal section on the line 2—2 on Fig. 1. The figures show an engine of the Diesel type.

On the drawing 1 is a cylinder block having therein four cylinders, 2, 3, 4, and 5, though the number of cylinders may be more or less than four. The block is composed of two superimposed sections 6 and 7 divided by the said line 2—2 so that Fig. 2 is a plan view of the section 6.

One side of the section 6 has in one wall marked 8 the air inlet chamber 9 extending along substantially the entire length of the section. It also extends from near the top of the section 6 to the crank case. Air is admitted into the chamber 9 through the louvers 10 arranged along the side and one end of the section 6.

The section 6 together with the lower portion of the section 7 contains the said cylinders 2, 3, 4, and 5, only one being shown complete in Fig. 1. It is to be understood that the others are like the one shown. As the construction related to each cylinder is the same, cylinder 2 only with its related parts will be described.

The cylinder 2 contains the piston 11 provided with the pitman 12 working in the crank case or chamber 13 below. The space in the cylinder between the section 7 and the top of the piston is the combustion chamber. The section 7 contains the air inlet valve, only one marked 14 being shown with its valve stem 15. The valve 14 closes by upward movement on its seat 16 which is connected by the curved passage 17 to the air inlet port 18 in the underface of the section 7. This port registers with the outlet port 19 in the chamber 9. Fig. 2 shows besides the outlet port 19, three other outlet ports 20, 21, and 22 which are connected to curved passages like the passage 17 and lead to valves and valve seats like the valve 14 and the seat 16 for the cylinders 3, 4, and 5. These extra valves and seats and passages are not shown as they are precisely like those described and shown.

23' is a port connecting the air chamber 9 with the crank chamber 13. As air is drawn into the cylinders a partial vacuum is created causing the gas and oil fumes in the crank chamber to be carried along with the air into the cylinders to be consumed. One objection to marine Diesel engines is that the crank case gases and oil fumes escape into the engine room to the discomfort of the persons there.

Opposite the air chambers are the chambers 23, 24, and 25 which accommodate the usual cam shaft and valve rods not shown.

26 is a cap for the section 7 and is intended to cover the mechanism, not shown, for transmitting motion from the cam shaft to the valve stems.

27 is a removable cover for the chambers 24 and 25 so that access may be had to these chambers for repair and adjustment of mechanism therein.

The air chamber 9 being positioned on one side of the cylinder block and the chambers 23 and 24 for the cam shaft and push rods being on the other side of the cylinder block provide a construction whereby the cover plate 27 may be removed and repairs and adjustments made without interrupting the operation of the engine. The cap 26 may also be removed without affecting the movements of the engine.

The air-intake chamber 9 is in the opposite wall of the block from that in which the chambers 23 and 24 are positioned so that more uniform thermal conditions obtained at opposite sides of the cylinders than would obtain if the chamber 9 were not present. The chamber 9 provides additional metal approximately equal to that inclosing the chambers 23 and 24. The cooling effect of the air entering the chamber is largely neutralized by the hot gases and fumes drawn from the crank chamber into the air chamber 9 when the pistons descend in their cylinders. Furthermore, the addition of the chamber 9 produces symmetry of design of the opposite sides of the block.

I claim:—

A cylinder block for internal combustion engines having parallel vertical cylinders, an air inlet chamber positioned within one side wall of the block and lying longitudinally thereof and adjacent to the cylinders, air passages leading from the chamber to each cylinder, inlet valves to close the passages at their outlets into the cylinders, and a second chamber in the opposite side wall of the block to accommodate the mechanism for operating the valves, the two opposite chambers serving to equalize the thermal conditions in the said opposite walls, in combination with a crank chamber below the cylinders having communication with the air inlet chamber whereby air passing to the cylinders drags the hot gases and fumes in the crank chamber along therewith and whereby heat is supplied to the air entering the air inlet chamber.

In testimony whereof I affix my signature.

CHARLES C. SLEFFEL.